(12) United States Patent
Tapper

(10) Patent No.: US 7,661,185 B2
(45) Date of Patent: Feb. 16, 2010

(54) METHOD FOR ASSEMBLING ROTOR OF PERMANENT MAGNET MOTOR

(75) Inventor: Kevin L. Tapper, Greensburg, PA (US)

(73) Assignee: Canopy Technologies, LLC, Jeannette, PA (US)

( * ) Notice: Subject to any disclaimer, the term of this patent is extended or adjusted under 35 U.S.C. 154(b) by 569 days.

(21) Appl. No.: 11/545,320

(22) Filed: Oct. 10, 2006

(65) Prior Publication Data

US 2008/0083112 A1    Apr. 10, 2008

(51) Int. Cl.
    *H02K 15/03* (2006.01)
(52) U.S. Cl. .................. 29/598; 29/732; 310/156.09
(58) Field of Classification Search .............. 29/607, 29/596, 598, 732; 310/156.08–156.09, 156.12–156.14, 310/156.18–156.19, 156.21–156.23, 156.25–156.29, 310/156.31, 156.48, 156.55, 156.59, 156.61, 310/156.63
    See application file for complete search history.

(56) References Cited

U.S. PATENT DOCUMENTS

| | | | |
|---|---|---|---|
| 3,818,586 A | 6/1974 | Harkness et al. | |
| 4,117,360 A | 9/1978 | Richter | |
| 5,040,286 A | 8/1991 | Stark | |
| 5,162,685 A | 11/1992 | Yamaguchi et al. | |
| 5,298,827 A | 3/1994 | Sugiyama | |
| 5,323,078 A | 6/1994 | Garcia | |
| 5,345,129 A | 9/1994 | Molnar | |
| 5,563,463 A | 10/1996 | Stark | |
| 5,596,238 A | 1/1997 | Milnikel | |
| 5,687,471 A | 11/1997 | Noguchi et al. | |
| 5,774,976 A | 7/1998 | Stark | |
| 5,881,447 A | 3/1999 | Molnar | |
| 5,881,448 A | 3/1999 | Molnar | |
| 6,552,459 B2 | 4/2003 | Burton | |
| 6,933,645 B1 * | 8/2005 | Watson | 310/156.09 |
| 7,415,756 B2 * | 8/2008 | Ishida et al. | 29/598 |
| 2002/0135252 A1 | 9/2002 | Burton | |
| 2004/0245884 A1 | 12/2004 | Smith | |
| 2006/0049713 A1 | 3/2006 | Toide et al. | |
| 2006/0066166 A1 | 3/2006 | Hauger et al. | |

FOREIGN PATENT DOCUMENTS

JP    58107612 A  *  6/1983

* cited by examiner

*Primary Examiner*—A. Dexter Tugbang
*Assistant Examiner*—Livius R Cazan
(74) *Attorney, Agent, or Firm*—The Webb Law Firm

(57) ABSTRACT

Apparatus and method for assembling a permanent magnet rotor comprising a rotor fixture configured to slide over a smaller diameter bearing section of the rotor and abutting one end of a center axial section of the rotor and a split compression ring having an inner diameter that is sized to ride over the outer diameter of magnets in magnet carriers assembled on the rotor fixture.

1 Claim, 7 Drawing Sheets

METHOD FOR ASSEMBLING ROTOR OF PERMANENT MAGNET MOTOR

BACKGROUND OF THE INVENTION

1. Field of the Invention

This invention relates to assembly of the rotor of a permanent magnet motor. The rotor has a plurality of recesses and overhung slots. Permanent magnet carriers and C-shaped lamination stacks are assembled in ring-shaped units interfitting with the recesses and overhung slots.

2. Description of Related Art

This invention relates to the assembly of the rotor of a permanent magnet motor generally as described in U.S. Pat. No. 6,933,645.

SUMMARY OF THE INVENTION

Briefly, according to this invention, there is provided an apparatus for assembling a permanent magnet rotor. The rotor is comprised of a non-magnetic cylindrical shaft having a larger diameter central axial section and two smaller diameter bearing sections. The central section has an even number of recesses defining an even number of ribs and overhung slots. The apparatus comprises a temporary rotor fixture configured to slide over a smaller diameter bearing section of the rotor and to abut one end of the center section. The axial end of the fixture adjacent the center section has a configuration matching the center section including ribs and overhung slots whereby magnets in magnet carriers and C-shaped lamination stacks can be assembled over the ribs of the rotor fixture. The apparatus further comprises a split compression ring having an inner diameter that is sized to ride over the outer diameter of the C-shaped lamination stacks. Fasteners are provided for joining the split compression ring to compress the C-shaped lamination stacks sufficiently to provide a riding clearance between the C-shaped lamination stacks and the overhung slots.

Briefly, according to this invention, there is provided a method for assembling a permanent magnet rotor. The rotor is comprised of a non-magnetic cylindrical shaft having a larger diameter central axial section and two smaller diameter bearing sections, the central section having an even number of recesses defining an even number of ribs with overhung slots. The method comprises placing a fixture over a smaller diameter bearing section of the rotor abutting one end of the center section. The axial end of the fixture adjacent the center section has a configuration matching the center section including ribs and overhung slots. Next, the magnets in magnet carriers and the C-shaped lamination stacks are slid over the ribs of the fixture. Next, a split compression ring having an inner diameter that is sized to ride over the outer diameter of the C-shaped lamination stacks assembled on the ribs is placed over the row of assembled magnets and lamination stacks and joined so that the split compression ring compresses the C-shaped lamination stacks sufficiently to provide a riding clearance between the C-shaped lamination stacks and the overhung slots. Next, the assembled row of magnets in magnet carriers and C-shaped lamination stacks are slid onto the rotor. Finally, the compression ring is removed leaving an assembled row of magnets in magnet carriers and C-shaped lamination stacks in place on the rotor.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 7:
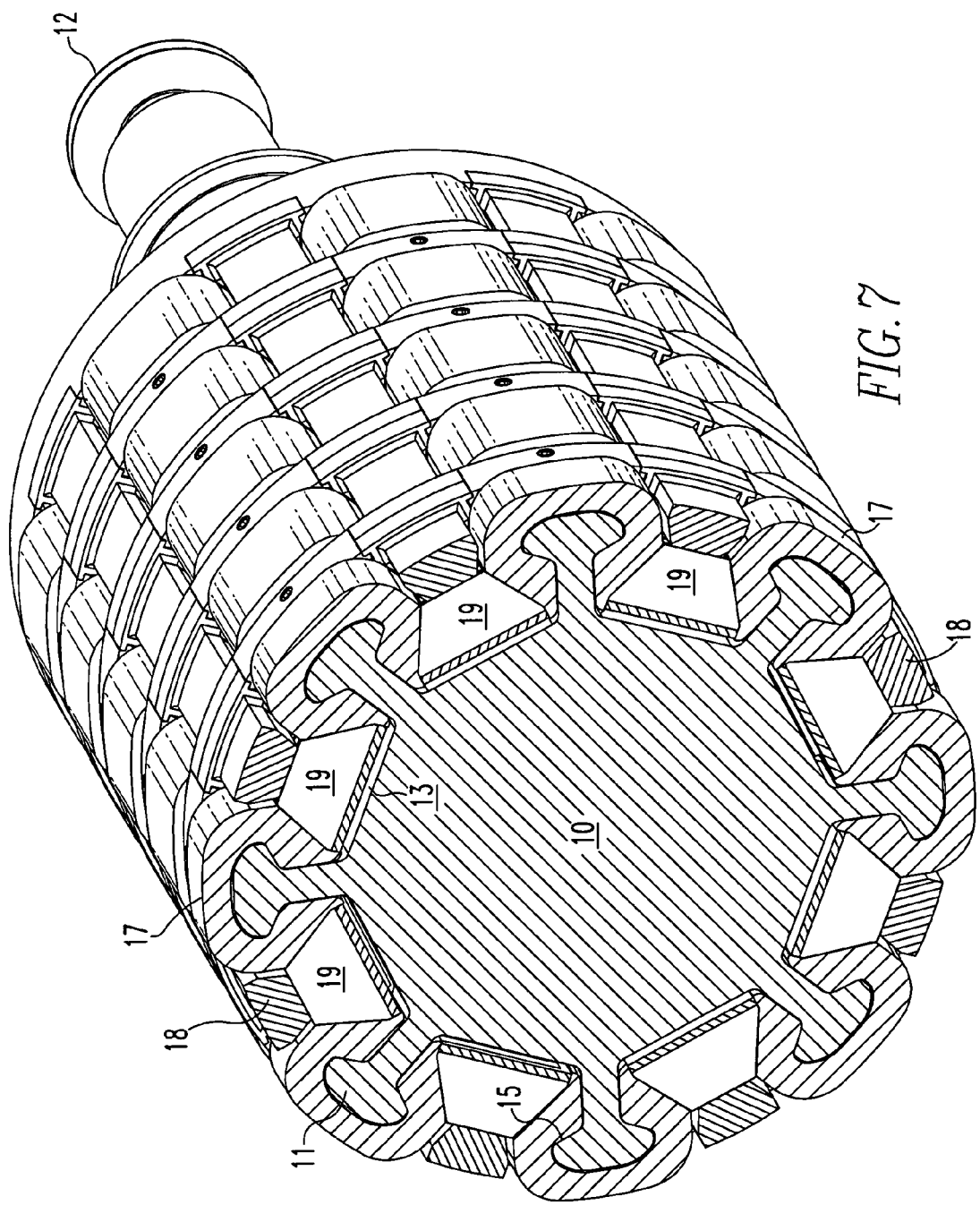
FIG. 7 is a perspective view in section of the assembled permanent magnet rotor.

Referring to FIG. 7, there is shown an assembled permanent magnet rotor shaft according to U.S. Pat. No. 6,933,645. The details of the magnet carriers and the C-shaped lamination stacks are set forth in that patent which is incorporated herein by reference. One of the challenges in assembling a permanent magnet rotor is to safely and securely assemble the rotor components on the shaft. The rotor is designed with tight tolerances and clearances. One of the major risks is gouging the shaft when sliding parts into position.

Referring to FIG. 7, the shaft 10 comprises the foundation of the permanent magnet rotor. The shaft 10 is made of non-magnetic, high-strength material, such as nickel cobalt alloy. The shaft 10 has an interrupted cylindrical surface defined relative to the rotational axis of the rotor. At each end of the shaft, provisions are made for bearings 12. The bearings 12 establish the rotational axis of the rotor. The shaft 10 has an even number of substantially identical recessed slots 13. The slots 13 define substantially identical generally T-shaped ribs 11 with overhung dovetail surfaces 15 adjacent the slots. The magnets 19 are positioned within the slots held by a cradle or carrier 18.

A plurality of generally C-shaped lamination stacks 17 comprised of magnetic, high-permeability material, such as electrical steel, surrounds the T-shaped ribs 11 as is clearly seen in FIG. 7. The stacks are made up of individual sheets positioned perpendicular to the axis of rotation of the shaft. The sheets have edges that abut the overhung dovetail surfaces of the ribs. In this way, the C-shaped lamination stacks are mechanically secured to resist centrifugal forces when the shaft rotates.

A plurality of non-magnetic cradles 18 hold the permanent magnets in position in each slot. Each cradle 18 carries laminated permanent magnets 19. Each cradle has a top wall and a bottom wall. These walls generally lie in the axial and circumferential directions when the cradle is installed in a slot on the rotor. The top wall abuts the magnets and resists the centrifugal force tending to throw out the magnets when the rotor rotates. The cradles are formed of lightweight, non-magnetic structural material, such as titanium. The cradles have axial end walls joined to the top and bottom walls. The bottom wall secures the axial end walls so that they do not collapse on the magnets when the top wall is urged radially outward at high rotation speeds. The axial end walls have edges that are configured to abut the overhung dovetail surface 15 of the ribs. The space between the axial end walls of the cradles is large enough to span the axial length of the magnets and also the axial length of the laminated stacks. Preferably, the axial length of the magnets and the laminated stacks is identical. The cradles are secured against centrifugal force by the engagement of the dovetail surfaces on the cradles and the overhung ribs. It is important to note that centrifugal force exerted by the cradle is applied directly to the ribs.

The assembly rotor, as shown in FIG. 7, has multiple stages (circumferential rows of magnets and C-shaped lamination stacks forming ring-shaped units) which are slid axially into position. As stated, the rotor assembly comprises a non-magnetic, cylindrical shaft 10 having an axis of rotation and a generally cylindrical surface. An even number of recessed slots define an even number of ribs. The ribs have an overhung configuration. The overhung surfaces after assembly of the magnet carriers and C-shaped lamination stacks restrain the magnet carriers and C-shaped lamination stacks from moving radially outward from the axis of the rotor during rotation of the rotor.

Once assembled, the permanent magnets attempt to draw the C-shaped lamination stacks radially inward. This causes the components of a row to push radially outward as a reaction to the forces generated by the permanent magnets. This, in turn, results in a force across the overhung surfaces 15. Forcing the stage axially along the shaft under these conditions can result in scoring or gouging of the ribs.

To overcome this problem, the stages are first assembled on a temporary rotor fixture 30 that at one axial end has a configuration substantially identical to the rotor. The temporary rotor fixture slides over the bearing 12 at one axial end of the rotor 10 and abuts the end of the ribs. The rotor fixture is rotated so that ribs 31 on the rotor fixture align with the ribs 11 on the rotor.

Figure 1:
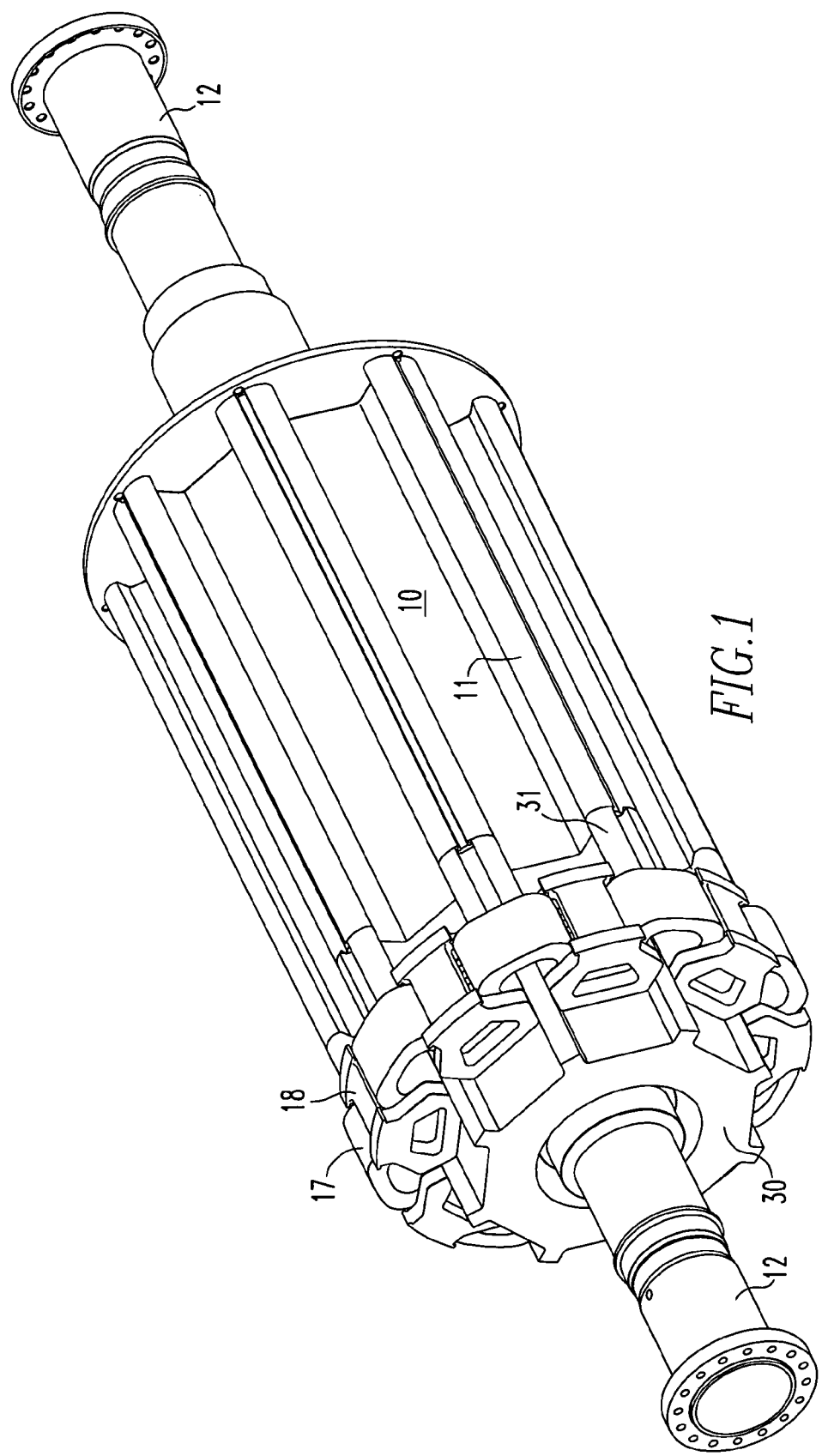
FIG. 1 shows a single row of magnet carriers and C-shaped laminations assembled on the temporary rotor fixture abutting one end of the rotor shaft.

The magnet carriers 18 are slid onto the rotor fixture and axially positioned with one edge of each magnet carrier engaging the overhung portion of ribs on the rotor fixture. The C-shaped lamination stacks 17 are then placed in contact with the C-shaped lamination stacks held by the magnet carriers. FIG. 1 shows the assembled row on the rotor fixture.

Figure 2:
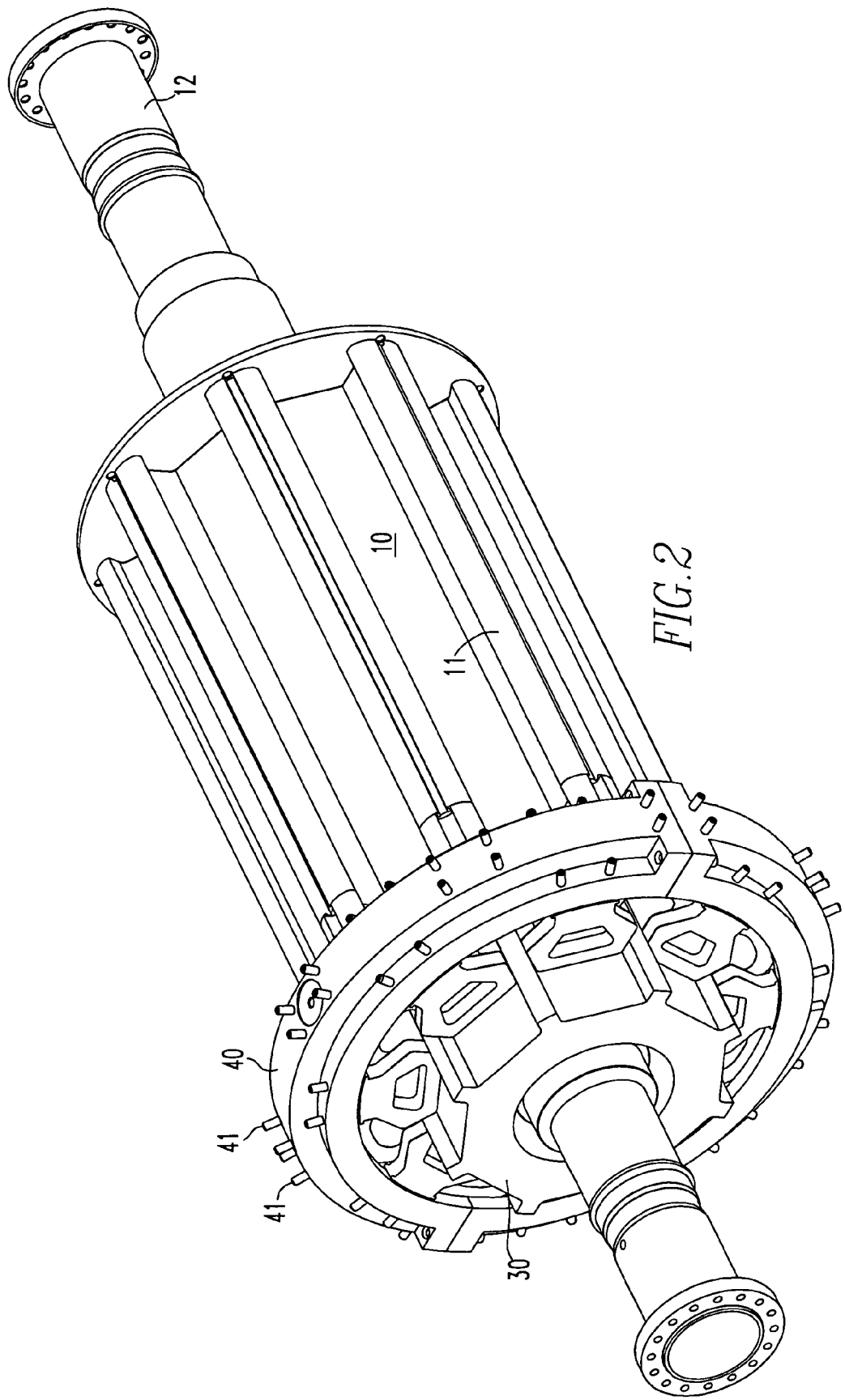
FIG. 2 shows the split compression ring placed over the single row of magnet carriers and C-shaped laminations.
Figure 3:
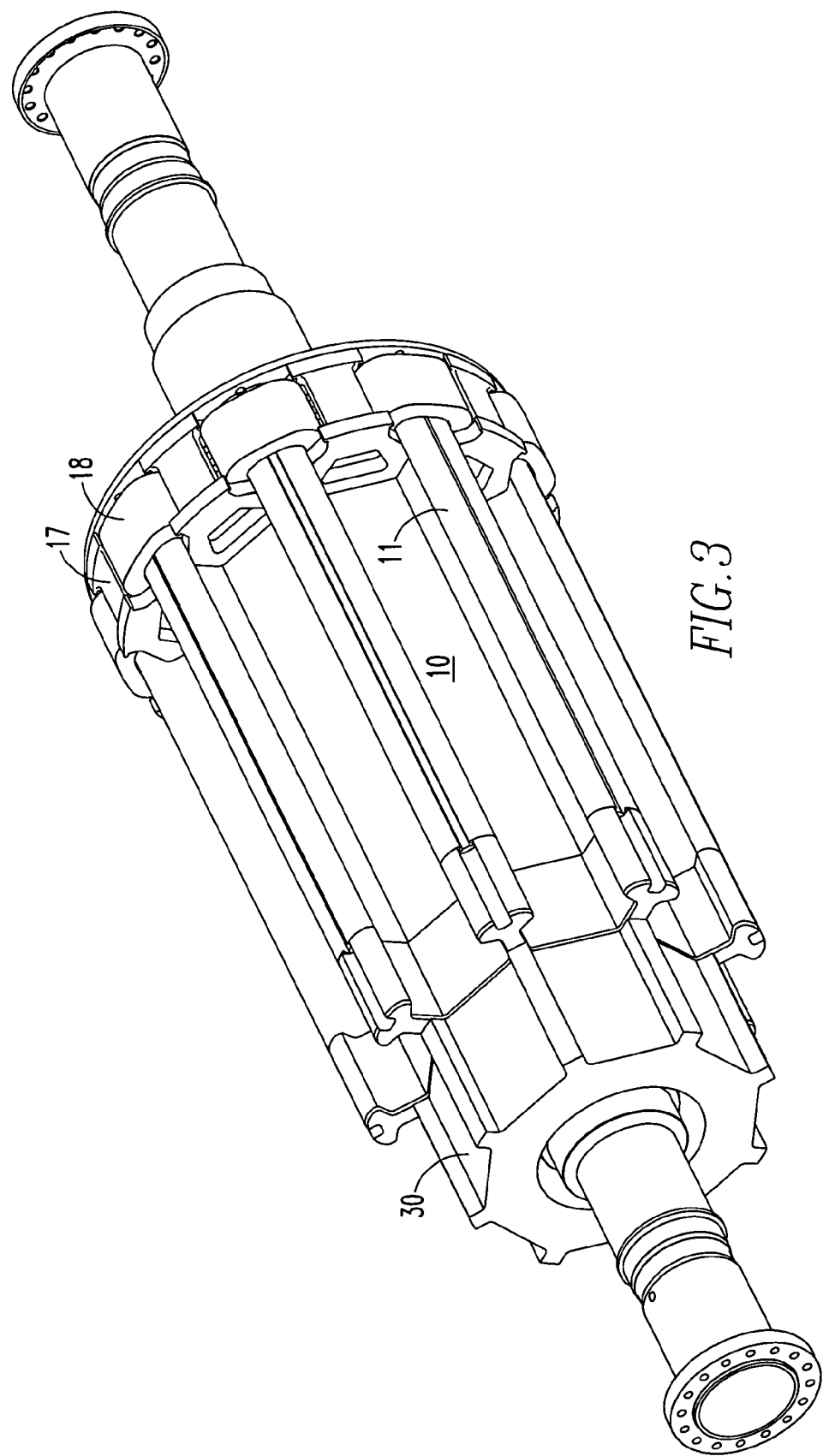
FIG. 3 shows the single row of magnet carriers and C-shaped laminations after being slid onto the rotor shaft and the split compression ring removed.
Figure 6:
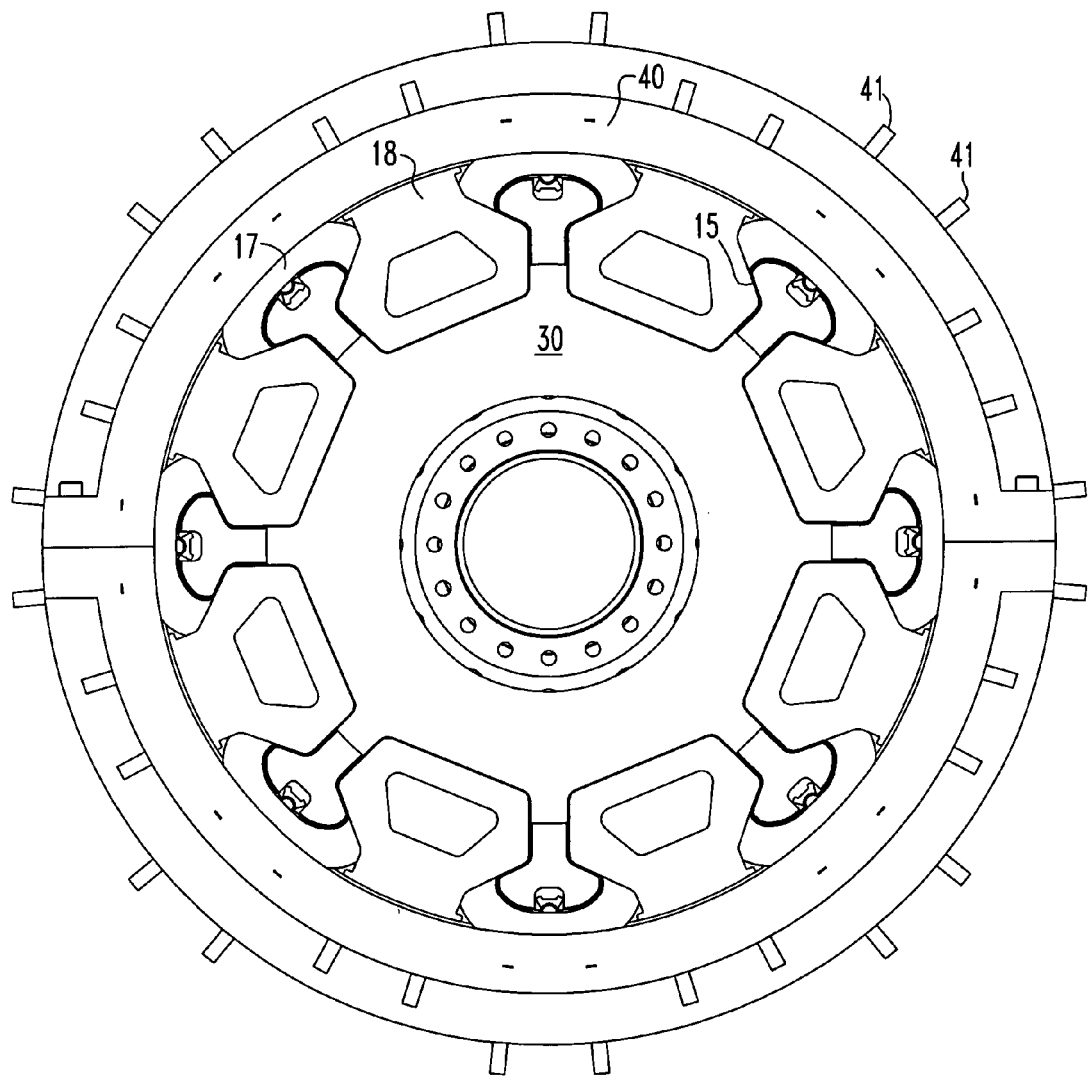
FIG. 6 is an end view of a row of magnet carriers and C-shaped laminations assembled on the temporary rotor fixture and with the split compression ring in place to remove pressure on the overhung portions of the ribs.

The split compression ring 40 is then secured over the assembled row as shown in FIGS. 2 and 6. The screws 41 are then turned in to compress the stage and remove pressure from the overhung surfaces of the ribs on the rotor fixture. The entire stage is then moved axially over the rotor into position as shown at FIG. 3.

The split compression ring 40 forms a clamp. The clamp is made so that it can apply pressure to push the components of the stage off the overhung surface of the ribs. The clearances of the components are set in a way that when components are pushed inward toward the center of the shaft, the components have acceptable clearances for sliding along the shaft.

After the stage is in position, the split compression ring or clamp 40 is removed allowing the components of the row to expand into the final assembly position. The process is then repeated to place an additional row in place on the rotor.

Figure 4:
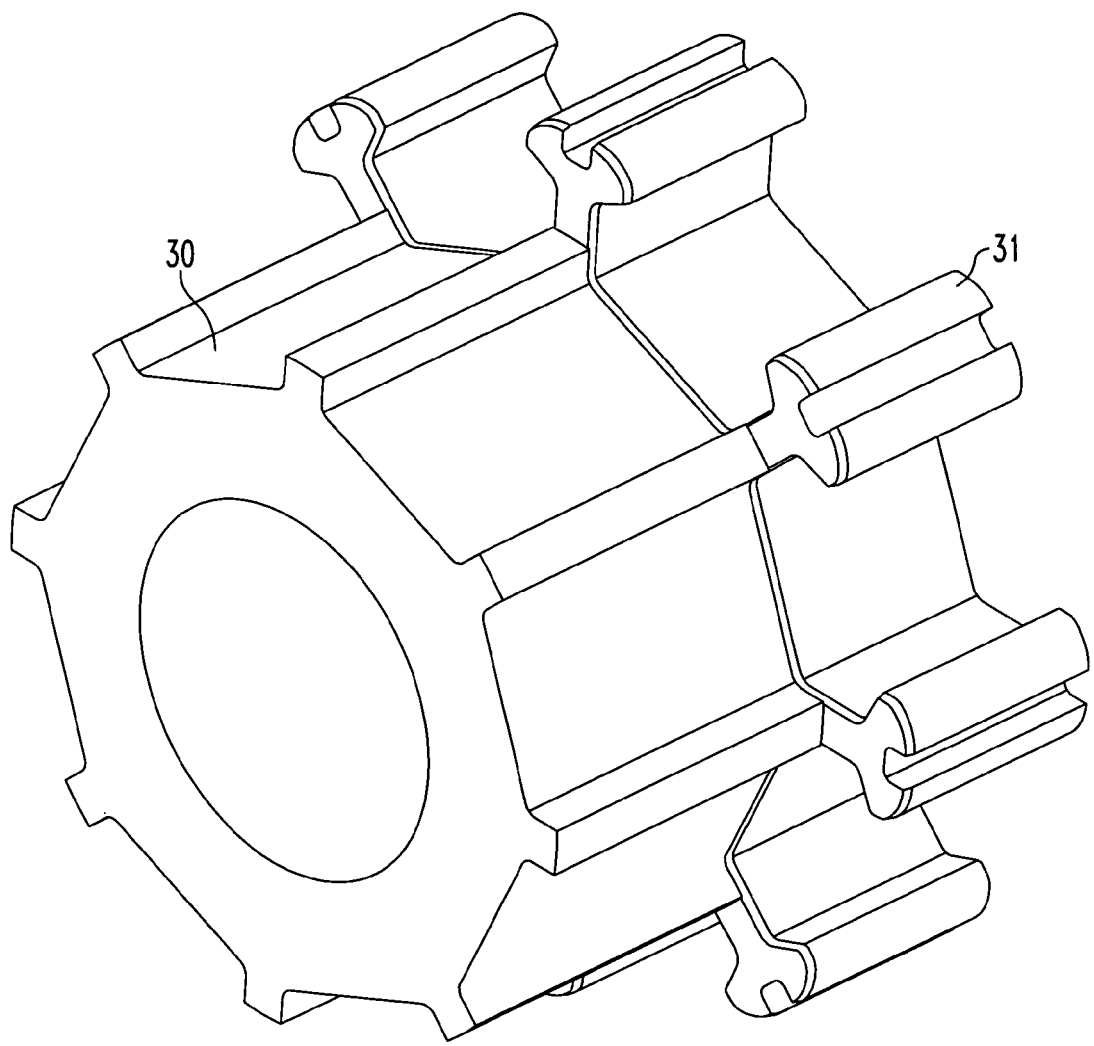
FIG. 4 is a perspective view of the temporary rotor fixture for assembling a row of magnet carriers and C-shaped laminations off the rotor shaft.

Referring to FIG. 4, the rotor fixture is shown in more detail. At one axial end, the fixture has ribs corresponding to the ribs on the rotor. The rotor fixture is formed of a non-magnetic material.

Figure 5:
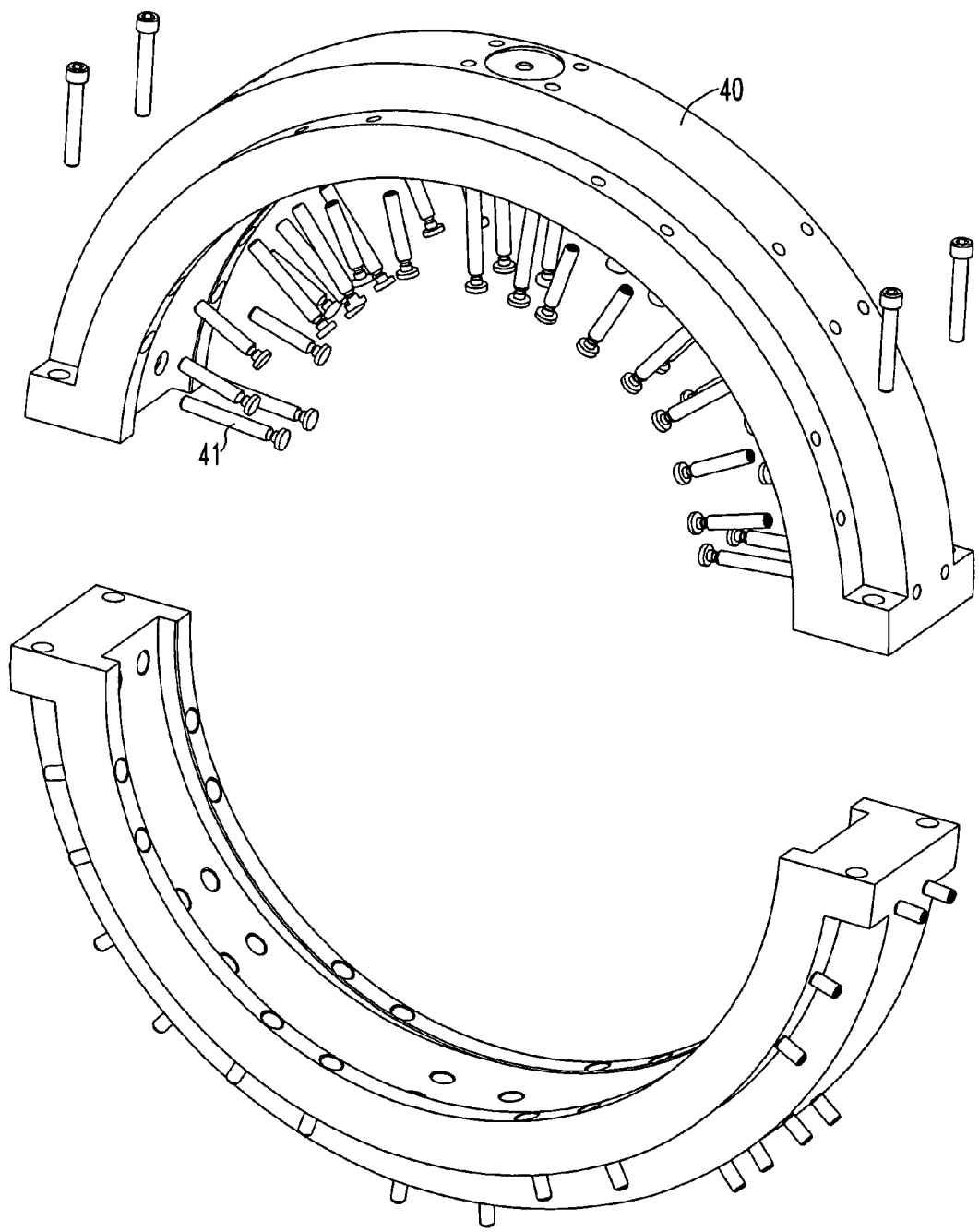
FIG. 5 is a perspective view of the split compression ring with the adjustment screws indicated.

Referring to FIG. 5, the split compression ring 40 is formed of a non-magnetic material, such as 300 Series stainless steel. Adjustment screws 41 have swivel heads at the end near the inner diameter of the compression ring so as to conform to the inner diameter when tightened in place. Thus, pressure can be applied to each component of the stage individually. This is accomplished by the adjustment screws aligned radially with each component. Preferably, a sleeve of soft material, such as Teflon®, is provided between the clamp and the rotor components so that the spit compression ring or clamp does not damage the components of the stage.

Having thus described my invention with the detail and particularity required by the Patent Laws, what is desired protected by Letters Patent is set forth in the following claims.

The invention claimed is:

1. A method for assembling a permanent magnet rotor, the rotor being comprised of a non-magnetic cylindrical shaft having a larger diameter central axial section and two smaller diameter bearing sections, the central section having an even number of recesses defining an even number of ribs with overhung slots, said method comprising the steps of:

a) placing a fixture over a smaller diameter bearing section of the rotor and abutting one end of the central section, the axial end of the fixture adjacent the central section having a configuration matching the central section, including ribs and overhung slots;

b) sliding magnets in magnet carriers and C-shaped lamination stacks over the ribs of the fixture to assemble a row;

c) placing a split compression ring over the outer diameter of the C-shaped lamination stacks assembled on the ribs and joining the split compression ring to compress the C-shaped lamination stacks sufficiently to provide a riding clearance between the C-shaped lamination stacks and the overhung slots;

d) sliding the compression ring and the assembled row of magnets in magnet carriers and C-shaped lamination stacks onto the rotor; and e) removing the compression ring leaving the assembled row of magnets in magnet carriers and C-shaped lamination stacks in place on the rotor.

* * * * *

UNITED STATES PATENT AND TRADEMARK OFFICE
CERTIFICATE OF CORRECTION

PATENT NO. : 7,661,185 B2
APPLICATION NO. : 11/545320
DATED : February 16, 2010
INVENTOR(S) : Kevin L. Tapper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this

Thirtieth Day of November, 2010

David J. Kappos
*Director of the United States Patent and Trademark Office*